(No Model.)

E. S. BOYNTON.
GALVANIC BATTERY.

No. 563,127. Patented June 30, 1896.

WITNESSES:
J. H. Wiman
Peter A. Ross

INVENTOR:
Edward S. Boynton
By Henry Connett
Attorney.

UNITED STATES PATENT OFFICE.

EDWARD S. BOYNTON, OF BROOKLYN, NEW YORK.

GALVANIC BATTERY.

SPECIFICATION forming part of Letters Patent No. 563,127, dated June 30, 1896.

Application filed February 21, 1895. Serial No. 539,195. (No model.)

*To all whom it may concern:*

Be it known that I, EDWARD S. BOYNTON, a citizen of the United States, residing at Brooklyn, in the county of Kings and State of New York, have invented certain new and useful Improvements in Galvanic Batteries, of which the following is a specification.

My invention relates to the class of galvanic batteries for generating electric currents, and the object is to so construct the battery that the cells, or battery elements, while independently removable, may have a liquid electrolyte in common, the battery yielding a voltage due to all of the elements when they are connected in series. It also has for its object to provide means for lifting out the zincs conveniently.

The invention will be fully described hereinafter, and its novel features carefully defined in the claim.

Figure 1:
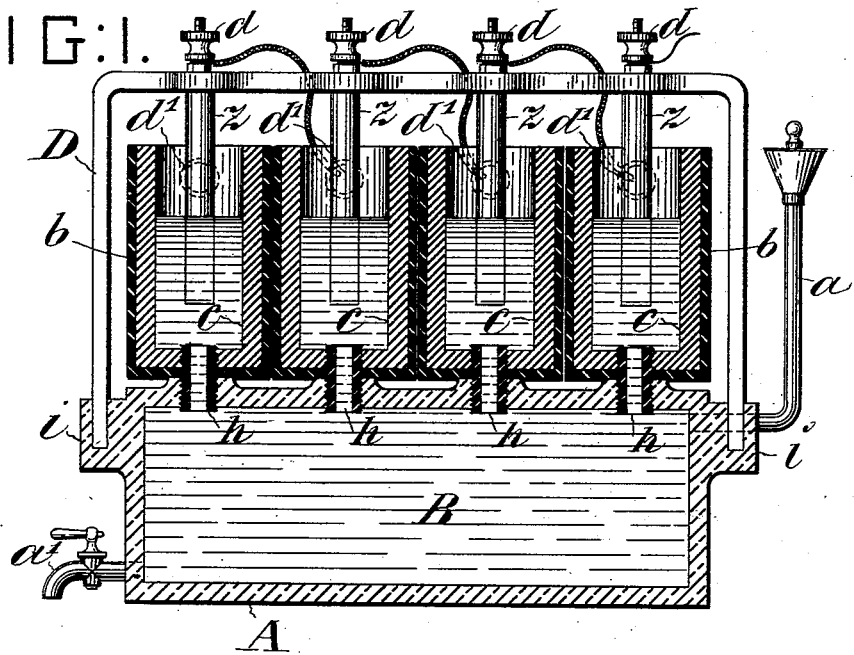
Figure 2:
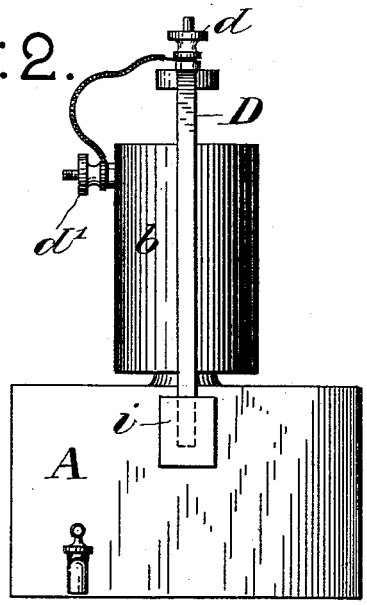

In the accompanying drawings, Figure 1 is a longitudinal vertical mid-section of a battery embodying my invention, and Fig. 2 is an end view of the same.

A represents a receptacle for the liquid electrolyte B, preferably the ordinary bichromate solution. This receptacle may be of any material which will not be affected by the electrolyte, such as hard rubber, glass, &c., and be of any suitable form and size. It will be wholly inclosed at sides, ends, top, and bottom, and be provided with an inlet $a$ and outlet $a'$. The battery elements or cells are mounted removably on the receptacle A, and are in the form of cups, open at the top. Each element comprises an outer cup-like casing $b$, which may be of some insulating substance or composition, as hard rubber, a carbon electrode $c$, also in the form of a cup and fitting into the casing $b$, a tube $h$, which serves to connect the chamber within the carbon electrode with the chamber in the receptacle A, through which tube the liquid electrolyte rises into the cell, and the zinc electrode $z$.

The cells will be arranged in a row or rows on the receptacle A, the tubes $h$ serving to connect them to the receptacle. This may be done by constructing the tube to screw into one of the parts, or to be fixed in the cell and fit as a stopper in the receptacle. I do not limit myself in this respect.

The zinc electrodes are secured in a frame D, the pendent ends of which enter sockets $i$ on the receptacle A. The zincs may be secured removably in the frame in any convenient manner. Each electrode $z$ is furnished with a binding-post $d$, and each electrode $c$ with a binding-post $d'$, Fig. 2.

The filling inlet-tube $a$ must rise high enough to enable the liquid electrolyte B to rise to the proper level in the cells.

Whenever desired, the liquid may be drawn off at the outlet $a'$, and the receptacle washed out and refilled. Each cell, although firmly secured to the receptacle, may be readily removed.

The casing $b$ and carbon $c$ are herein represented as cylindrical, but this is not essential. They may have any desired form, in plan, and the zinc electrode may also have any desired form. The carbon electrodes $c$ are represented as cups with bottoms, but these bottoms are not essential.

It must be understood that in my battery the liquid electrolyte B is common to all of the cells or elements at all times and that the openings in the bottoms of the cells are not merely for filling them from a tank. The tube $a$ enables the liquid B to rise into all of the cells to the proper level.

Having thus described my invention, I claim—

In a galvanic battery the combination with the receptacle A, for the liquid electrolyte, and a frame D mounted removably on said receptacle, corresponding electrodes C supported in pendent position by said frame, cup-like electrodes encircling each of said pendent-supported electrodes, the outer electrodes being arranged and held in immediate juxtaposition by an insulating medium or bond and which are removably mounted on said receptacle by means of vertically-connecting insulated screw-threaded tubes that are in open relation with the cells thus formed and the receptacle containing the electrolyte, substantially as described.

In witness whereof I have hereunto signed my name in the presence of two subscribing witnesses.

EDWARD S. BOYNTON.

Witnesses:
HENRY CONNETT,
PETER A. ROSS.